(12) United States Patent
Deemer et al.

(10) Patent No.: US 6,554,602 B2
(45) Date of Patent: Apr. 29, 2003

(54) MACHINE FOR MAKING A CARBONATED SOFT DRINK BOTTLE WITH AN INTERNAL WEB AND HAND-GRIP FEATURE

(75) Inventors: David A. Deemer, Adrian, MI (US); Christopher C. LaBombarbe, Ypsilanti, MI (US)

(73) Assignee: Schmalbach-Lubeca AG (DE)

( * ) Notice: Subject to any disclaimer, the term of this patent is extended or adjusted under 35 U.S.C. 154(b) by 0 days.

(21) Appl. No.: 09/989,885

(22) Filed: Nov. 21, 2001

(65) Prior Publication Data

US 2002/0030307 A1 Mar. 14, 2002

Related U.S. Application Data

(62) Division of application No. 09/258,583, filed on Feb. 26, 1999, now Pat. No. 6,428,735.

(51) Int. Cl.[7] .......................... B29C 49/12; B29C 49/20; B29C 49/48; B29C 49/68
(52) U.S. Cl. ..................... 425/525; 425/174.4; 425/526; 425/529; 425/534
(58) Field of Search .............................. 425/174.4, 525, 425/526, 534, 535, 529

(56) References Cited

U.S. PATENT DOCUMENTS

| | | | |
|---|---|---|---|
| 4,079,104 A | 3/1978 | Dickson et al. |
| 4,279,349 A | 7/1981 | Aigner |
| 5,232,108 A | 8/1993 | Nakamura |
| 5,332,112 A | 7/1994 | Blocker |
| 5,398,828 A | 3/1995 | Valyi |
| 5,482,170 A | 1/1996 | Semersky et al. |
| 5,529,195 A | 6/1996 | Valyi |
| 5,837,170 A | 11/1998 | Valyi |

*Primary Examiner*—Robert Davis
(74) *Attorney, Agent, or Firm*—Harness, Dickey & Pierce, P.L.C.

(57) ABSTRACT

A machine and method for blow molding a polyester bottle for carbonated beverages with an internal web structure positioned between two hand-grip depressions. The machine and method uses an injection-molded preform having a web feature and maintains the web of the preform in a precise position during heat-treatment and eventual blow molding into the bottle. Heat-treatment involves an oven capable of heating and cooling selected regions of the preform by using a combination of shields, heat energy reflective surfaces, and cooling airflows. Bottle blow molding involves precise placement of the preform relative to hand-grip surfaces in a blow mold cavity and cooling airflow of the internal web structure before bottle removal.

32 Claims, 11 Drawing Sheets

MACHINE FOR MAKING A CARBONATED SOFT DRINK BOTTLE WITH AN INTERNAL WEB AND HAND-GRIP FEATURE

CROSS-REFERENCE TO RELATED APPLICATIONS

This application is a divisional of U.S. patent application Ser. No. 09/258,583 filed on Feb. 26, 1999, and now U.S. Pat. No. 6,428,735 B1. The disclosure of the above application is incorporated herein by reference.

BACKGROUND OF THE INVENTION

1. Field of the Invention

This invention relates generally to a machine and method for blow molding a one-piece carbonated beverage bottle with an internal web structure positioned between two hand-grip depressions. Although not exclusively, a bottle blow molder will use a polyethylene terephthalate (PET) polyester material to make the bottle, a material having a molecular structure capable of biaxial orientation.

2. Description of the Prior Art

Carbonated beverage products are commonly contained in polyester bottles. This bottle typically comprises: a neck portion defining an opening, a shoulder portion depending therefrom, a closed base portion, and a sidewall portion extending between the base and shoulder portions. The sidewall portion typically has a cross-sectional shape circular in character.

The method for making polyester bottles by biaxially orienting its material structure is well known. The method requires a preform made first, usually with an injection molding process. This preform typically comprises: a neck portion defining an opening, a body portion depending therefrom, and an integral bottom portion depending from the body portion. The body portion defines a hollow space, with a circular cross-sectional shape, closed at the bottom portion and open at the neck portion.

The preform body and bottom portions are heated to a specific temperature and placed in a closed bottle blow molding cavity where a flow of high pressure air inflates the preform to form the bottle with a relatively uniform wall thickness. The specific temperature desired with polyethylene terephthalate material is about 105 degrees Celsius to about 120 degrees Celsius. The flow of high-pressure air (about 3800 kilopascals), often in combination with a mechanical means, stretches the preform and orients the molecular structure of the material in an axial direction. In addition, high-pressure air stretches the preform and orients the molecular structure of the material in a circumferential direction generally perpendicular to the axial direction. Commonly identified as biaxial orientation, this bidirectional molecular orientation of the polyester material generally enhances bottle strength and performance.

A well-known method to establish the specific temperature of the preform body and bottom portions is to place the preform onto a rotatable spindle within an oven. As the spindle moves along a path through the oven, the preform is rotated a specified distance from a controllable energy source for a specified time. Typically, shields prevent the neck portion of the preform from heating significantly. Machinery operators occasionally use reflectors or shields within the oven to direct heat away from or toward selected areas of the preform. When the preform achieves proper temperature, a mechanism positions it in the blow mold cavity. A second mechanism then inflates the preform to form the bottle.

The polyester material used to blow mold the bottle is a relatively poor conductor of heat energy. Injection molded polyethylene terephthalate material is unique in that it can assume an amorphous form, which is clear and transparent when unpigmented, or a semicrystalline form, which is usually opaque. When amorphous polyethylene terephthalate as found in the injection molded preform is heated for a sufficient time to a temperature between about 85 degrees Celsius and about 250 degrees Celsius large spherulitic crystals form causing the material to become opaque. The highest growth rate of crystals occurs at about 175 degrees Celsius, and at this temperature, the material, depending on its molecular weight and other factors, will become opaque in about 90 seconds. At 100 degrees Celsius the growth rate is several minutes.

The oven is at a significantly higher temperature than the desired temperature of the preform. During heat-treatment, the preform exterior overheats risking growth of spherulitic crystals, but the preform is inflated and subsequently cooled in the blow mold cavity before noticeable crystals actually form.

Because of its relatively large cross-sectional size, bottles containing approximately one liter of the carbonated beverage product or more are often difficult for a consumer to grip, particularly while pouring the beverage into a cup or glass.

U.S. Pat. No. 5,398,828, incorporated by reference, discloses a bottle for carbonated beverages intending to be easier to grip. The bottle has two generally opposed depressions in its sidewall to form a hand-grip. An internal web structure between the two grip depressions prevents eversion of the hand-grip.

For making the bottle with the internal web structure supporting the hand-grip feature, U.S. Pat. No. 5,398,828 also discloses a preform, as described above, including an internal web portion extending completely across the hollow space from the bottom portion to the body portion and terminating in the body portion. When blow molded, the molecular structure of the material within the body, bottom, and web portions of the preform must now be biaxially oriented.

The method for heating or conditioning the preform to a specific temperature described above will treat a webbed preform sufficiently to allow the molding of a bottle.

However, inadequate heating of the web portion in the preform and inadequate cooling of the web portion in the blow molded bottle create crystalline structures, stresses, and web distortions that tend to degrade bottle performance and appearance. The web does not have a smooth flat appearance. Furthermore, the internal pressure created inside the bottle from the carbonated beverage act on structural stresses often causing the web portion to separate from the bottle sidewall portion. Adequately heating the preform web portion and cooling the bottle web portion requires additional care.

The object of this invention is to provide a method to heat the body portion, bottom portion, and web portion of the preform to specific temperatures without overheating any of those portions and to blow mold this preform into a bottle with reduced structural stresses and distortions and with a smooth and generally flat internal web structure.

The invention is a machine and a method for blow molding a bottle with an internal web structure between two hand-grip depressions from a preform. The preform features a neck portion with an open end, a body portion depending from the neck portion, a bottom portion depending from the body portion and forming a closed end. The neck portion, body portion, and bottom portion define a hollow space with a common axis and a circular cross-sectional shape. An internal web portion extends completely across the hollow space from the bottom portion and terminating within the body portion.

The machine basically features a means for in-feeding the preform; a means for heating the body portion, bottom portion, and internal web portion; a means for inflating the preform in a bottle blow mold cavity defining the hand-grip depressions; and a means for cooling the internal web structure of the bottle before removal from the bottle blow mold cavity.

The method basically includes the steps of in-feeding the preform; heating the body portion, bottom portion, and internal web portion of the preform; inflating the preform in a bottle blow mold cavity defining the hand-grip depressions; cooling the internal web structure of the bottle; and removing the bottle from the bottle blow mold cavity.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE DRAWINGS

FIG. 16b is a partial cross-sectional view, generally taken along line 16b—16b, of the internal web structure and the stretch rod shown in FIG. 16a.

DESCRIPTION OF THE INVENTION

Figure 1:
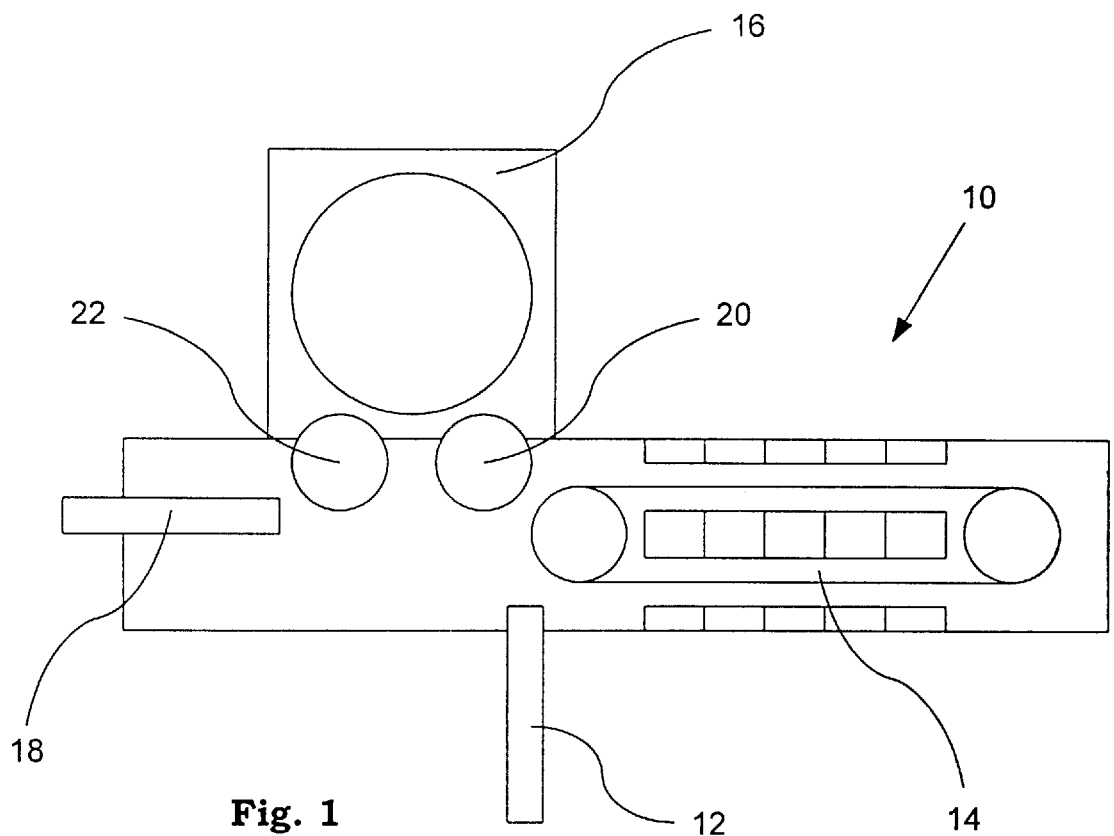
FIG. 1 is a schematic plan view of a blow molding machine with an oven and a blow molding section used in practicing the present invention for making a bottle with an internal web structure.

Referring now to the drawings, FIG. 1 illustrates in schematic plan view a blow-molding machine 10 for practicing the invention disclosed. Entering through a preform in-feed and alignment device 12, blow-molding machine 10 receives a preform 30 manufactured on a separate injection-molding machine. Such injection-molding machines are common in the industry, and it is not necessary to discuss fully these machines in this disclosure.

The blow-molding machine 10 consists of six main subsections: the preform in-feed and alignment device 12, an oven 14 where preform 30 receives a heat-treatment, preform transfer 20, blow molding section 16 where preform 30 is inflated and shaped into a bottle, bottle transfer 22, and bottle output 18. The blow-molding machine 10 further consists of, although not illustrated, all necessary operating controls, drives, actuators, valves, switches, relays, wiring, plumbing, blowers, ducting, utility connections and other related components common to blow molding machines.

Figure 2:
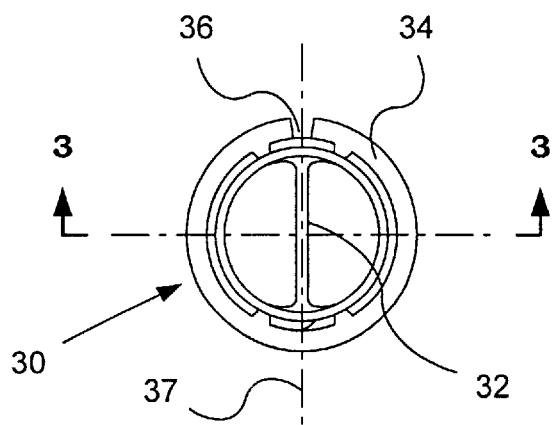
FIG. 2 is a top plan view of a preform used in practicing the present invention.

FIG. 2 is a top plan view of a preform 30 showing a web portion or web 32 and a handling ring 34 with a notch 36. The web 32 and notch 36 have a common centerline 37.

Figure 3:
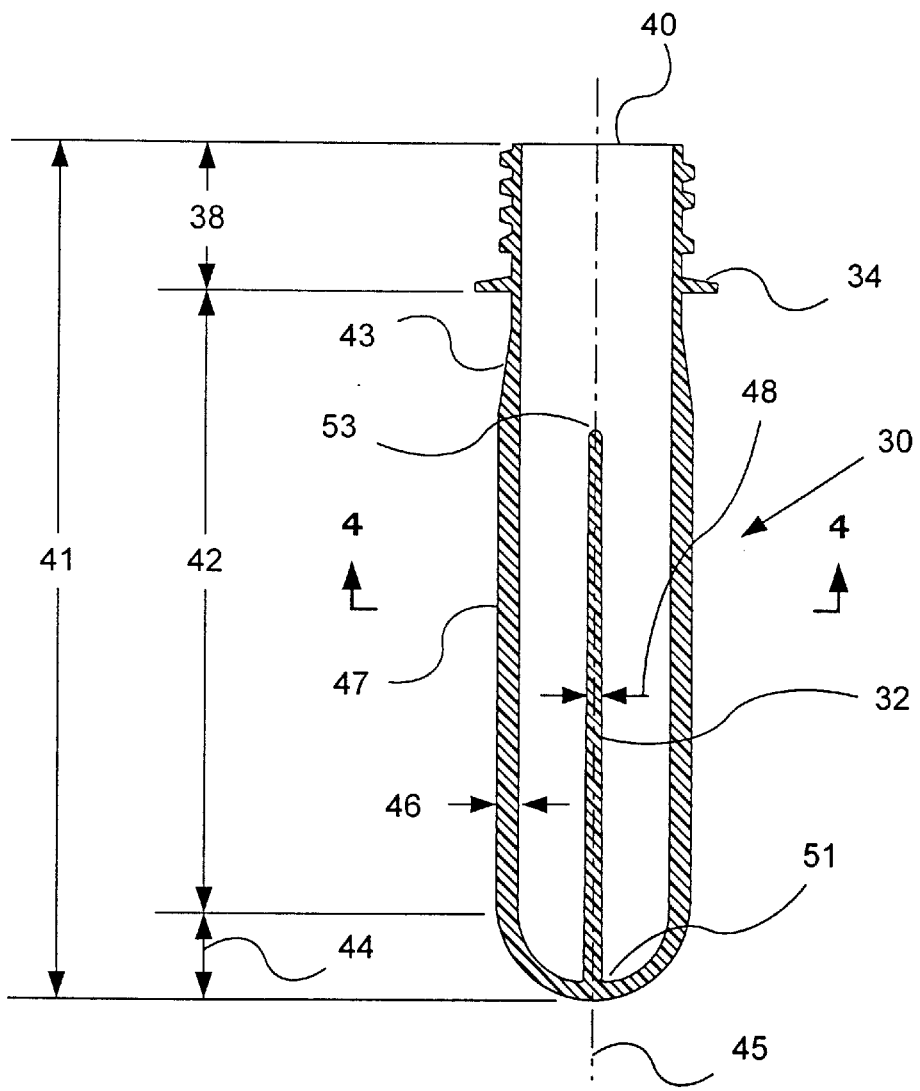
FIG. 3 is a cross-sectional view, generally taken along line 3—3, of the preform shown in FIG. 2.

FIG. 3 is a cross-sectional view taken along line 3—3 of FIG. 2 illustrating regions within preform 30 and illustrating an overall length 41 and an outside surface 47. Preform 30 has a neck portion 38, an open end 40 in neck portion 38, a body portion 42, and an integral bottom portion or a closed end 44. Web 32, open end 40, and closed end 44 have a common axial centerline 45. The neck portion 38, including handling ring 34, incorporates any one of a number of shape configurations suitable to engage a closure (not illustrated) for sealing the bottle once molded. The body portion 42 includes a transition region 43. The body portion 42 often is a different size, either smaller or larger, than the neck portion 38. The transition region 43 provides a smooth connection. The closed end 44 is generally hemispherical in shape with generally hemispherical exterior and interior surfaces. While the hemispherically shaped closed end 44 is preferred, other end geometry is feasible, for example, ends with a flat surface or a "bullet" nose. Web 32 with a termination edge 53 is predominately located within body portion 42 and is shorter than the overall length of preform 30. Web 32 connects to and blends with closed end 44 with a web-to-closed-end blending 51. The web-to-closed-end blending 51 is a simple radius or compounded radii or a combination where a simple radius merges with compounded radii.

Figure 4:
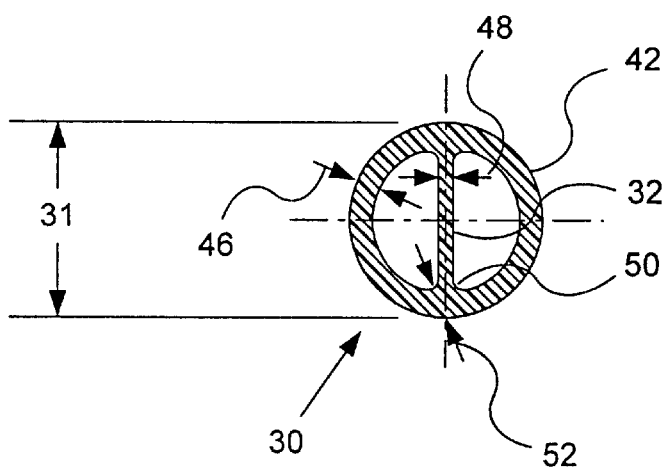
FIG. 4 is a full cross-sectional view, generally taken along line 4—4, of the preform shown in FIG. 3.

FIG. 4 is a cross-sectional view of preform 30 taken along line 4—4 of FIG. 3 further illustrating web 32 and a body portion 42 with a diameter 31. Body portion 42 in part has a sidewall thickness 46. Web 32 has a web thickness 48. Web thickness 48 is an average thickness with its thickness being greater toward the closed end 44 and lesser toward the open-end 40. The average web thickness 48 is generally between 50% and 90% of maximum sidewall thickness 46 of body portion 42. Web thickness 48 must be thin enough to cool and minimize a tendency to crystallize while thick enough not to create an injection weld weakness at the web's center point. Those skilled in the art of injection molding realize that during the injection molding of the preform 30, the web portion 32 will fill with PET material last. Consequently, two flow fronts entering from opposite sides of the web portion will weld together at the center point.

Web 32 blends with body portion 42 through a web-to-sidewall blending 50. Web-to-sidewall blending 50 can be a simple radius, but the inventors discovered that a compounded radii is preferred. The sidewall blending 50 with a properly selected compounded radii establishes a web-to-sidewall thickness 52 slightly thinner and thus less apt to crystallize than what is likely with the simple radius providing the same strength. The compound radii minimizes any tendency at web 32 to separate from body portion 42 during the inflation of preform 30 in blow molding section 16 of blow-molding machine 10 or to separate later when a molded bottle is filled with a highly carbonated beverage. The slightly thinner, but as strong, web-to-sidewall thickness 52 also helps to establish a more consistent temperature treatment of the web 32, sidewall thickness 46, and body portion 42 in oven 14 of blow-molding machine 10.

While the inventions as developed for the heat treating and blow molding of preforms having an internal web 32, it will be appreciated by those skilled in this; technology that the invention will also find applicability in the heat treating and blow molding of preforms without internal webs. Specifically, the invention could be utilized in the heat treating and blow molding of preforms where the sidewall thickness is not constant around the circumference of the preform. Utilizing the present invention, such a varying thickness preform could be heated so that the temperature is consistent at all thicknesses.

Figure 5:
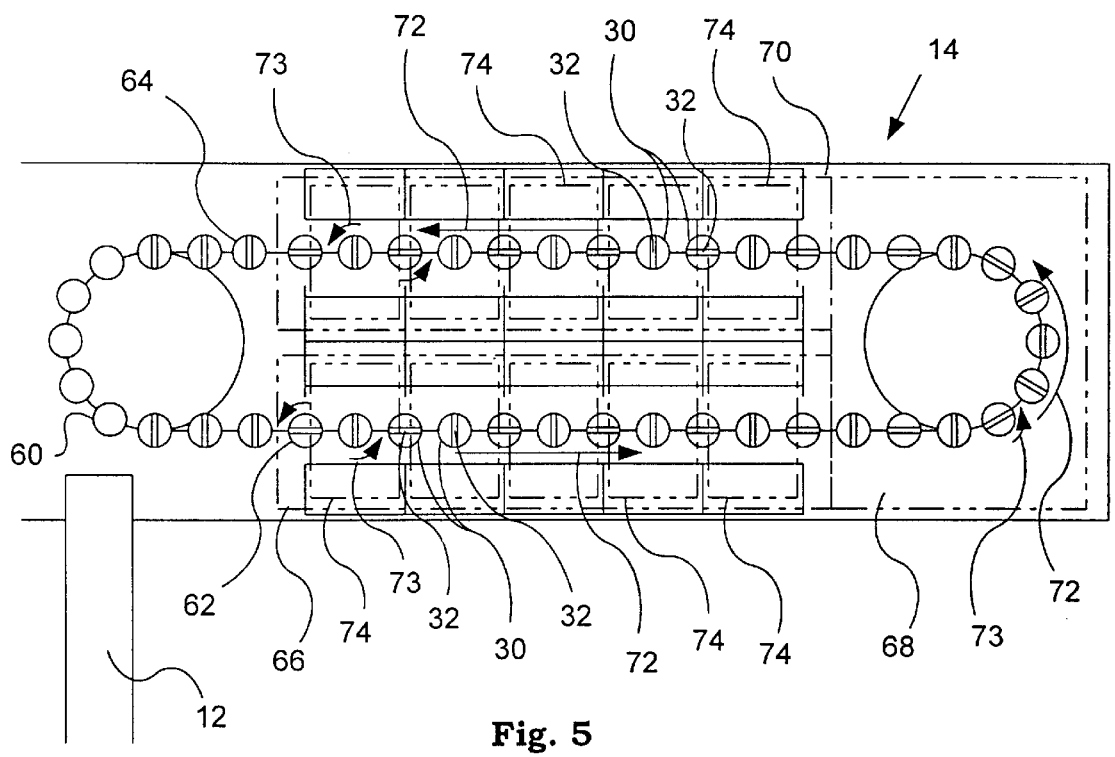
FIG. 5 is a schematic plan view of the oven shown in FIG. 1 further illustrating a series of individual heating units.

FIG. 5 is a schematic view of oven 14 providing additional detail. A series of preforms 30 enter the preform in-feed and alignment device 12 and are precisely aligned, using notch 36 of handling ring 34 as a guide, and placed onto a spindle 60. Moving smoothly at a constant velocity through oven 14 in travel direction 72, the spindie 60 is smoothly and continuously rotating in direction 73 at a consistent speed beginning at start point 62 and continues to smoothly rotate simultaneously with the movement through oven 14 until reaching end point 64. The machine uses a common conventional means to rotate spindle 60.

Oven 14 is a linear arrangement consisting of three subsections: a phase one oven 66, a heat-treatment rest 68, and a phase two oven 70. Phase one oven 66 and phase two oven 70 each contain at least one heating unit 74. In the illustrated embodiment of FIG. 5, phase one oven 66 and phase two oven 70 each contain five heating units 74. The heating unit 74 is either a first heating unit 174 in FIG. 6, a second heating unit 274 in FIG. 7, or a third heating unit 374 in FIG. 8. Heating units manufactured for or by a specific machinery builder are universal in nature to the builder's blow molding machinery. Depending on the production capacity of blow molding machine 10, oven 14 may have forty or more various heating units in a series.

The linear arrangement of oven 14 is a common arrangement provided by oven builders. However, some builders use a circular arrangement with heating units positioned along a circular path. While the inventors prefer the linear arrangement, those skilled in the art will recognize the circular arrangement could also be satisfactory.

As preform 30 smoothly rotates in direction 73 and smoothly advances through oven 14 in travel direction 72, its web 32 at certain times will be in a position parallel to the travel direction 72 and at other times will be in a position perpendicular to the travel direction 72. For the sake of clarity, individual preforms have been given designation "preform 80" and "preform 82" enabling individual preforms to be more readily followed as they progress through oven 14. Preform 80 in FIG. 6 is shown at the moment when its web 32 is parallel to travel direction 72, and preform 82, also seen in FIG. 6, is shown at the moment when its web 32 is perpendicular to travel direction 72.

Figure 6:
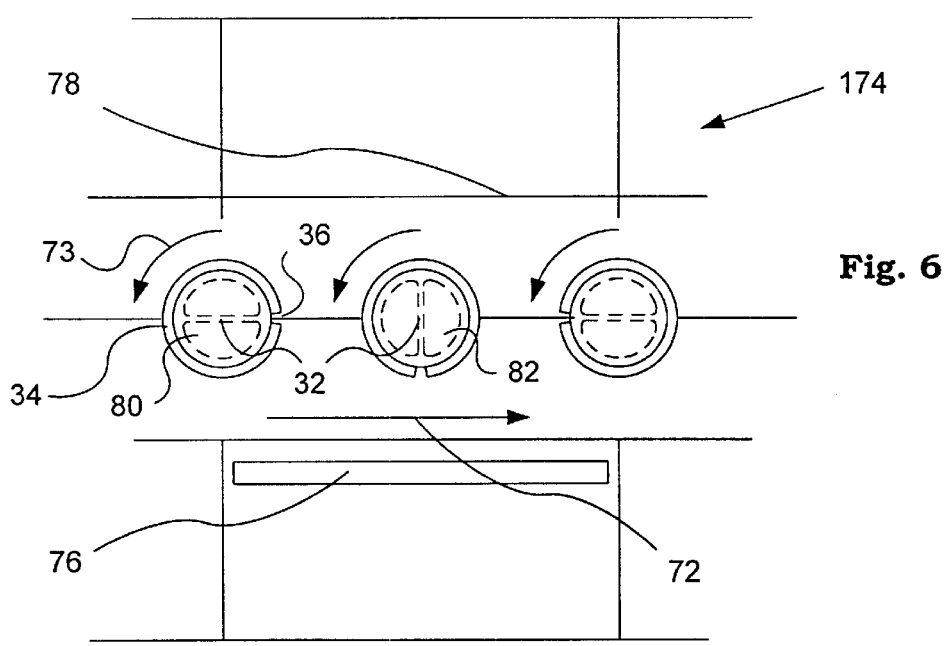
FIG. 6 is a schematic plan view of a heating unit as seen in FIG. 5 with a solid reflector.

FIG. 6 illustrates the first heating unit 174 with a solid reflector surface 78. An energy source 76, typically a lamp, provides heat-treatment and extends between nearly from each end of the heating unit 174. Solid reflector surface 78 reflects a portion of the energy from source 76 toward preform 80 and preform 82. As the preform rotates, the outside surface 47 alternately receives direct heat-treatment from energy source 76 and indirect heat-treatment from the solid reflector surface 78.

Figure 7:
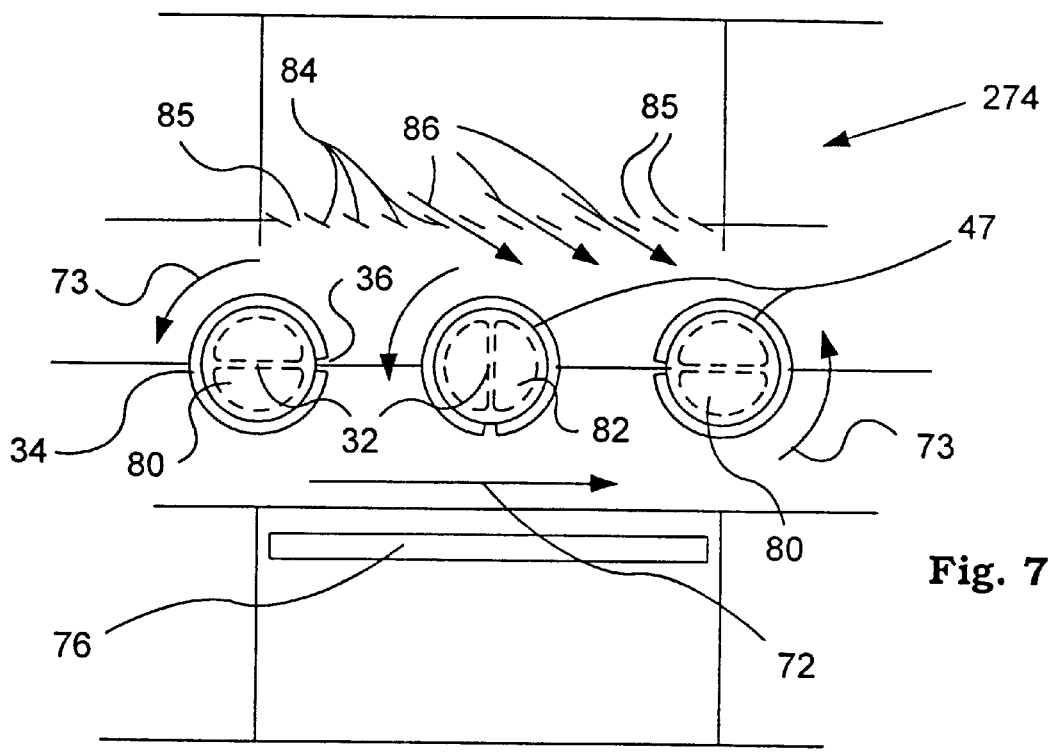
FIG. 7 is a schematic plan view of a heating unit as seen in FIG. 5 with a louvered reflector.

FIG. 7 illustrates the second heating unit 274 with a louvered reflector surface 84. A flow of air 86 moves into the second heating unit 274 through a plurality louver openings 85 in a direction not perpendicular to travel direction 73. The flow of air 86, powered by a fan, not illustrated, is about 32 degrees Celsius. The flow of air 86 slightly cools the outside surface 47 of preform 80 and preform 82 preventing the outside surface 47 from overheating. Overheating will spherulitic crystals to form in the polyester material. Energy source 76 is the same variety as in the first heating unit 174, and the louvered reflector surface 84 also reflects energy from source 76 toward the preform. As the preform 30 rotates, the outside surface 47 alternately receives direct heat-treatment from energy source 76 and indirect heat-treatment from the louvered reflector surface 84 coupled with the cooling flow of air 86. This alternating treatment helps drive heat energy through the sidewall thickness 46 without overheating outside surface 47 and creating spherulitic crystallization.

Figure 8:
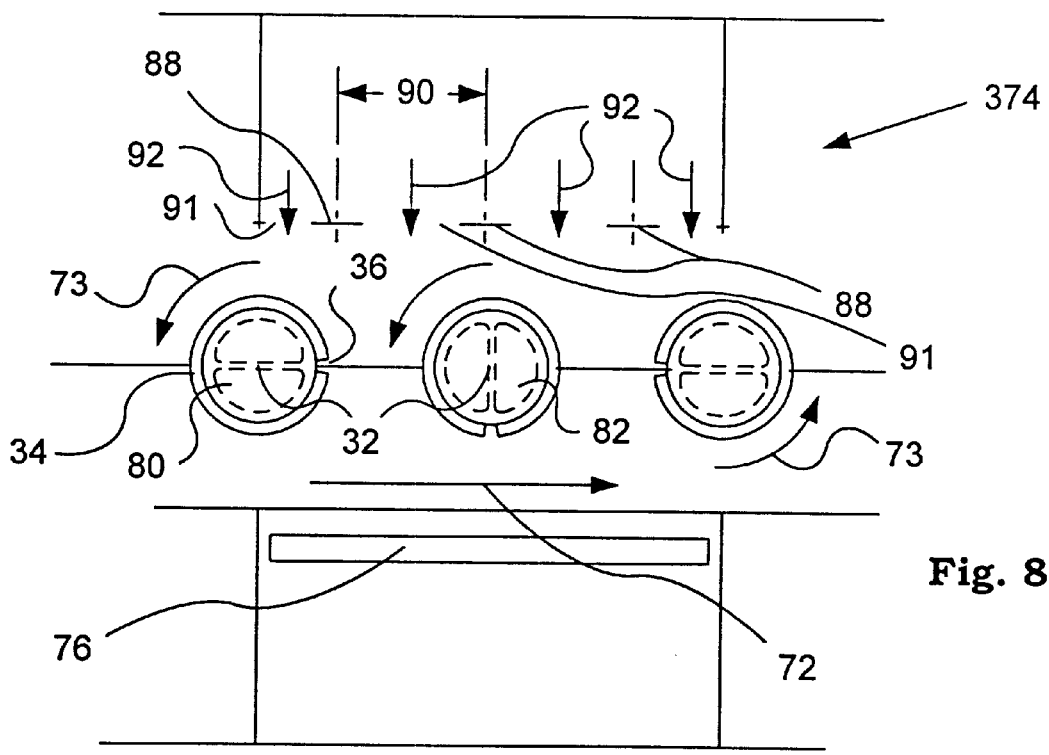
FIG. 8 is a schematic plan view of a heating unit with a series of preferential reflectors and with a series of preforms in a position relative to the preferential reflectors.

FIG. 8 illustrates the third heating unit 374 with a series of preferential reflector surface 88. FIG. 8 illustrates three of these preferential reflector surfaces 88. Depending on the specific design criteria and preform size, third heating unit 374 may contain more or less than three preferential reflector surfaces 88. Each preferential reflector surface 88 is a distance 90 from an adjacent surface 88 equal to the linear distance in the travel direction 72 in which 180 degrees of preform rotation occurs. A flow of air 92 through open space 91 into the third heating unit 374 is generally perpendicular to preform 80 and travel direction 72 but generally tangential to preform 82 providing selected cooling where needed. Preferential reflector surface 88 concentrates reflected energy from source 76 toward a zone of outside surface 47 of preform 82 generally perpendicular to web 32 providing selected heat-treatment where needed. The flow of air 92 prevents the preform sidewall elsewhere in the preform from overheating, retarding growth of spherulitic crystals.

Figure 9:
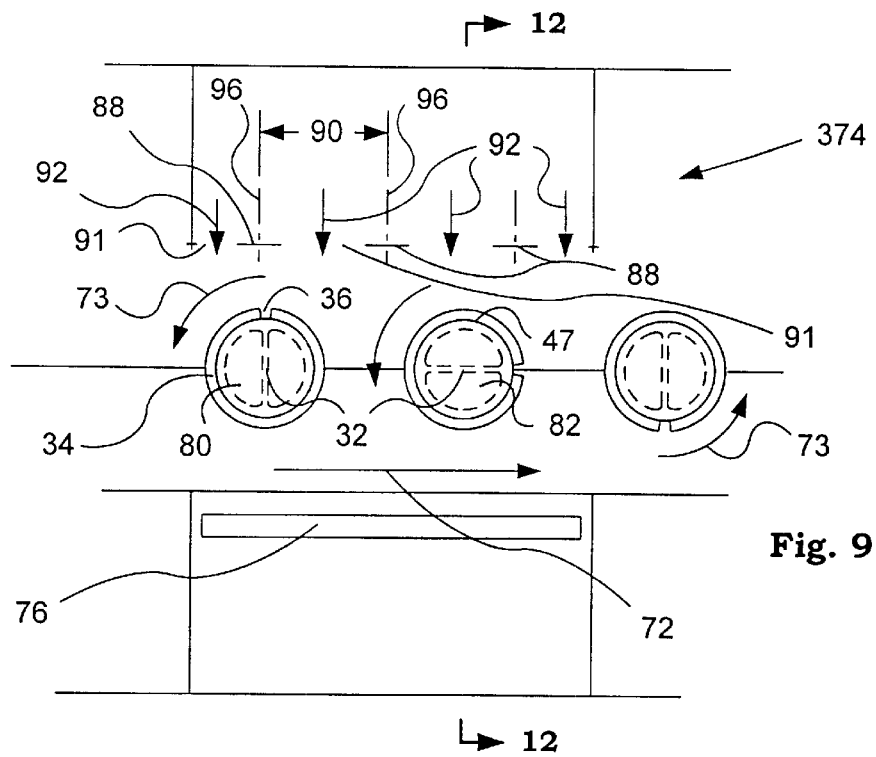
FIG. 9 is a schematic plan view of the heating unit shown in FIG. 8 with the series of preforms advanced slightly to a new position with each preform having been rotated 90 degrees and each repositioned relative to the preferential reflectors.

FIG. 9 is a view of the third heating unit 374 in FIG. 8 at slightly later moment in time. FIG. 9 illustrates the selective heating and cooling of specific preform surface areas as it advances through the oven 14. As compared to FIG. 8, preform 80 has advanced slightly in travel direction 72 and rotated slightly in direction 73 such that web 32 is now perpendicular to travel direction 72 and in a position opposite preferential reflector surface 88. Likewise, preform has advanced in travel direction 72 and rotated in direction 73 such that web 32 is now perpendicular to the flow of air 92. As the preforms 30 rotate, a given portion of outside surface 47 alternately receives direct heat-treatment from energy source 76 and indirect heat-treatment from the preferential reflector surface 88. At this time in the heat-treatment of preform 30, most of the sidewall thickness 46 is at the desired temperature. The web 32 and area of preform 30 where the web 32 blends with the body portion 42 have not yet reached the desired temperature. The preferential reflector surfaces 88 help drive additional heat energy into the web 32 and the air cooling helps minimize overheating of other areas of the preform body portion 42.

Figures 10, 11:
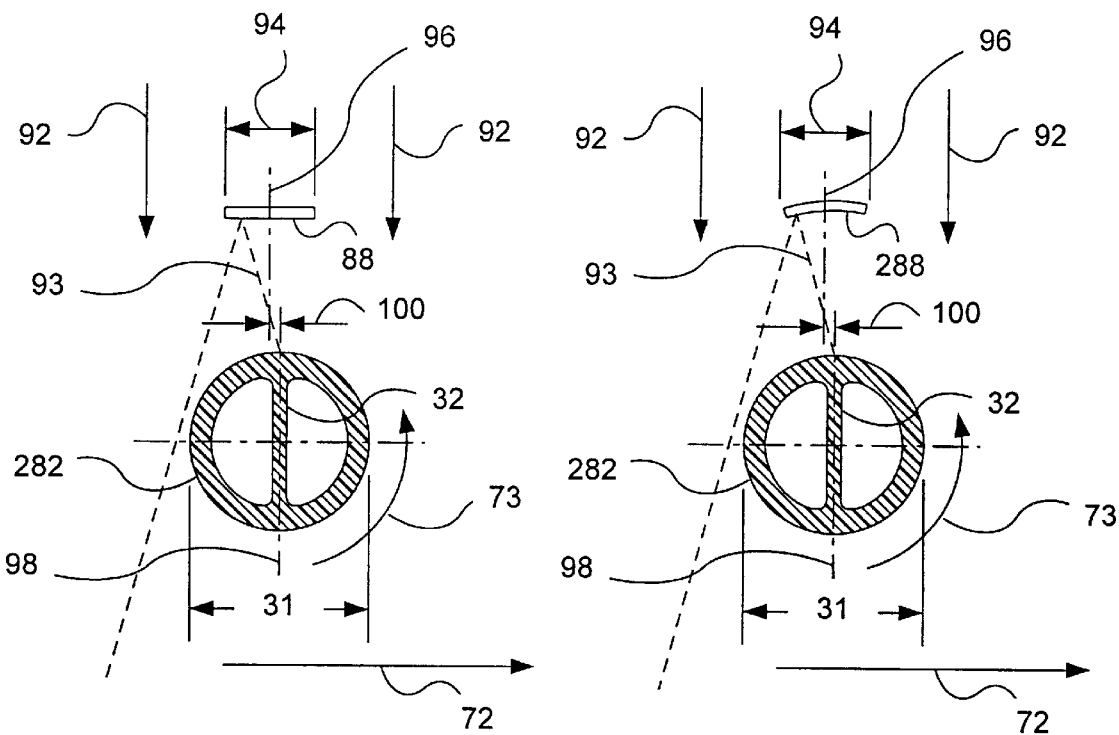
FIG. 10 is a similar cross-sectional view of the preform shown if FIG. 4 and further illustrating a relationship between the preform and one of the preferential reflectors shown in FIG. 8.
FIG. 11 is similar to FIG. 10 showing an alternative curved preferential reflector.

FIG. 10 is an enlarged illustration of preform 82 in FIG. 8 opposite a preferential reflector surface 88. The inventors discovered that to achieve a uniform heat-treatment of web 32 from reflected energy 93 a slight offset 100 at web's centerline 98 from reflector centerline 96 is desirable when these two features are parallel. As illustrated, the offset 100 of web centerline 98 from reflector centerline 96 is in a same direction as travel direction 72 when preform rotation is in direction 73.

Preferential reflector surface 88 has a width 94 from 150 percent of preform diameter 31 to about 25 percent of preform diameter 31. Offset 100 is generally from zero to about 50 percent of preform diameter 31. The open space 91 has a width measurably larger than the preferential reflector width 94.

Before this invention, those skilled in the art used ovens with preferential reflectors to heat-treat a preform for molding a bottle with an extreme oval cross-sectional shape. In the oval bottle application, the corresponding open space between reflector surfaces is significantly smaller in width than the width of the reflector surface, contrary to the present invention. The intent was to cool slightly a narrow surface parallel to the preform axis while maintaining a proper heat-treatment in the remainder of the preform with use of the reflectors. This was an attempt to alter material distribution in the resulting blow molded oval container.

The inventors discovered that relatively narrow preferential reflectors could be used to heat further a selected surface while maintaining a proper heat-treatment in the remainder of the preform with use of cooling airflow.

A generally flat preferential reflector surface 88 is preferred. However, one alternative embodiment is a curved preferential reflector surface 288 as seen in FIG. 11. The curved preferential reflector surface 288 can be a segment of a cylinder or semi-spherical, paraboloidal or semi-ellipsoidal in nature and respectively creates a focused ribbon of energy, or a focused circular or elliptical point of energy, directed to a precise location along the axial length 41 of preform 30. An advantage of the curved preferential reflector surface 288 is a precise focus and placement of reflected energy 93. Depending on circumstances, a combination of flat preferential reflector surfaces 88 and curved preferential reflector surfaces 288 is an option for precise preform heat-treatment.

Figure 12:
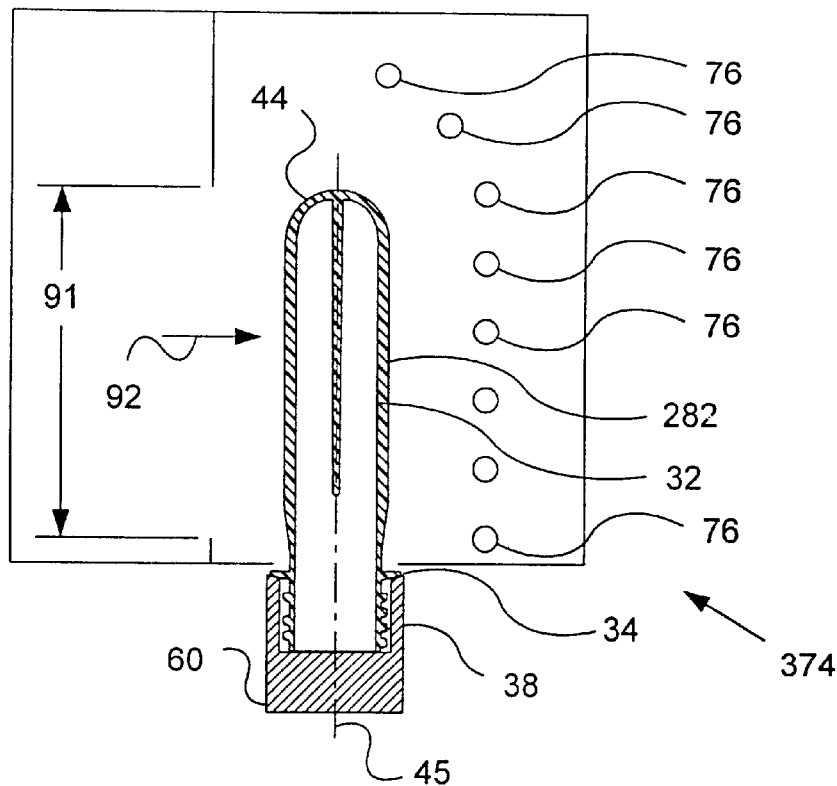
FIG. 12 is an elevational cross-sectional schematic view, generally taken along line 12—12, of the heating unit shown in FIG. 9.

FIG. 12 is a schematical cross-sectional view of the third heating unit 374 taken along line 12—12 of FIG. 9. The view illustrates an array of approximately six to ten individual energy sources 76 starting at a point approximately adjacent to preform axial centerline 45 to a point approximately adjacent to preform handling ring 34. Within certain limits, each energy source 76 is adjustable permitting each, as necessary, to have a position with a different amount of space from each energy source 76 to the preform. As a group, the entire array is adjustable parallel and perpendicular to centerline 45. For consistency, the array of individual energy sources 76 and its relationship to the preform 30 is mostly identical in the first heating unit 174 and second heating unit 274 for a given preform 30 shape.

Each energy source 76 is a tubular infrared lamp heater positioned parallel to travel direction 72 and extending nearly from one end of the heating unit 374 to the other. Furthermore, each energy source 76 of the array has an individually controlled power source (not illustrated) permitting different levels of heat-treatment along preform 30 from its handling ring 34 to its closed end 44. Shielding (not illustrated) prevents the energy source 76 from significantly heating the preform neck portion 38. Typically, power settings for the energy source 76 adjacent to the closed end 44 and handling ring 34 are at a reduced level relative to those located between these two. In addition, other energy sources 76 between may be set at varying reduced levels. Because a specific energy source 76 within the array of a given heating unit 74 will likely have the same power setting, corresponding energy sources 76 in adjacent heating units 74 can use the same power source control. While corresponding energy sources 76 of adjacent heating units 74 may have a common power source control, individual energy sources 76 within a single heating unit may be permanently active or inactive.

The above permits corresponding energy sources 76 from one heating unit to the next to be "on" in a given heating unit, "off" in the next heating unit, and "on" again in the next heating unit. In other words, the relative energy source 76 within the array of energy sources 76 can alternate from an "on" condition in the first heating unit 74 to an "off" condition in the corresponding energy source 76 of the next heating unit 74 to an "on" again condition in the corresponding energy source 76 of the next unit 74. The inventors discovered this alternating arrangement often provides a more acute heat-treatment for selected regions within the preform 30 because the energy sources 76 still "on" are operating at a higher power setting and at top efficiency. This apparently provides a more desirable energy frequency for penetrating the PET material. The inventors discovered that lower power settings in all energy sources 76 "on" do not have the same apparent heat penetration effect.

Proper treatment of the web 32 requires the acute heat-treatment of web 32, but the approach risks overheating the sidewall 46 of body portion 42 between the web-to-sidewall blending 50. After acute heating at the web-to-sidewall blending 50 and therefore the web 32, the next heating unit minimizes overheating in the regions between the web-to-sidewall blending 50 by providing only cooling to those regions. In this way, the web 32 receives penetrating heat energy while minimizing the overheating of the outside surface 47 of the preform.

Phase one oven 66, FIG. 5, for most production situations will contain a combination of heating unit(s) 74, including in series one or more of the first heating unit 174 followed by one or more of the second heating unit 274. Phase one oven 66 may also include one or more of the third heating unit 374.

Phase two oven 70, FIG. 5, for most production situations will contain a combination of heating unit(s) 74, including in series one or more of the third heating unit 374 followed by one or more of the second heating unit 274. Following treatment in the third heating unit 374, the preform outside surface 47 is not uniform. The preferential reflector surface 88 has driven additional heat energy into the preform body portion 42 where the web 32 blends with the body portion 42. A final heat-treatment with the second heating unit 274 allows the outside surface 47 to become more consistent in temperature before the preform 30 is transferred to the blow molding section 16.

Between phase one oven 66 and phase two oven 70 is the heat-treatment rest 68, which allows preform 30 to equilibrate without adding more heat energy.

Figure 13:
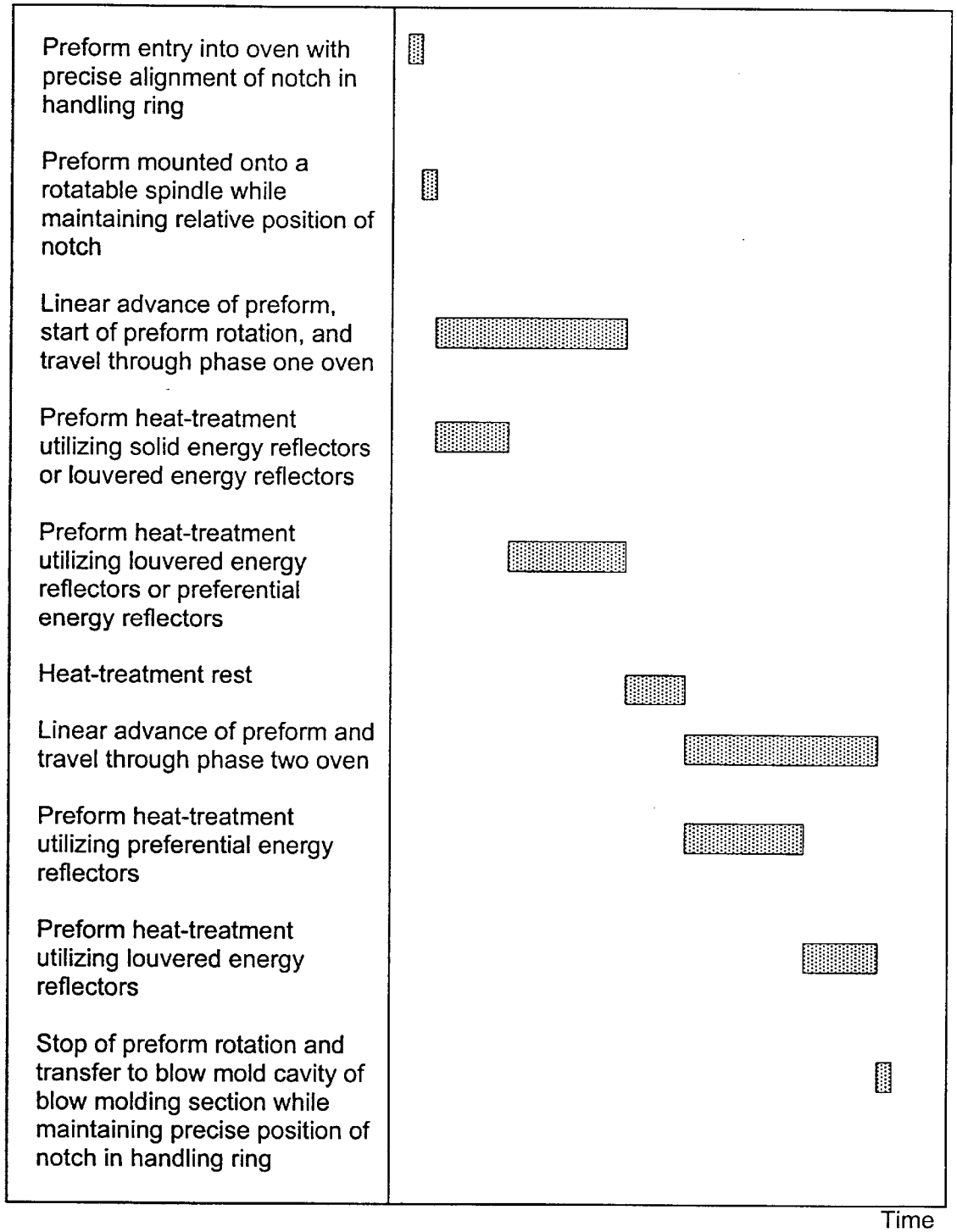
FIG. 13 is a chart illustrating a sequence of key events in order of occurrence as the preform travels through the oven shown in FIG. 5.

FIG. 13 summarizes the preferred method for heat treating the preform 30 as it passes through the oven 14 of blow-molding machine 10. The heat-treating method begins with preform 30 entry into the preform in-feed and alignment device 12 with a precise alignment of notch 36. Next, spindle 60 receives preform 30 while maintaining relative position of notch 36. Next, preforms 30 advance linearly through phase one oven 66 and begin to rotate at start point 62. Preform 30 heat-treatment begins with oven units 174 utilizing solid energy reflectors 78, but depending on preform 30 design details and other factors, oven units 274 utilizing louvered energy reflectors 84 may be appropriate. Heat-treatment of preform 30 in the remainder of phase one oven 66 is with oven units 274, but again depending on preform 30 design details and other factors, oven units 374 utilizing preferential energy reflectors 88 may be appropriate. The heat-treatment rest 68 follows phase one oven 66 before preforms 30 enter and travel through phase two oven 70. Still rotating, in phase two oven 70 preforms 30 first pass through oven units 374 and then through oven units 274. Rotation of preform 30 ends at end point 64 and prior to preform transfer 20 to the blow molding section 16. As it leaves oven 14, preform transfer 20 maintains precise location of notch 36 and precisely positions preform 30 within blow molding section 16.

Figure 14:
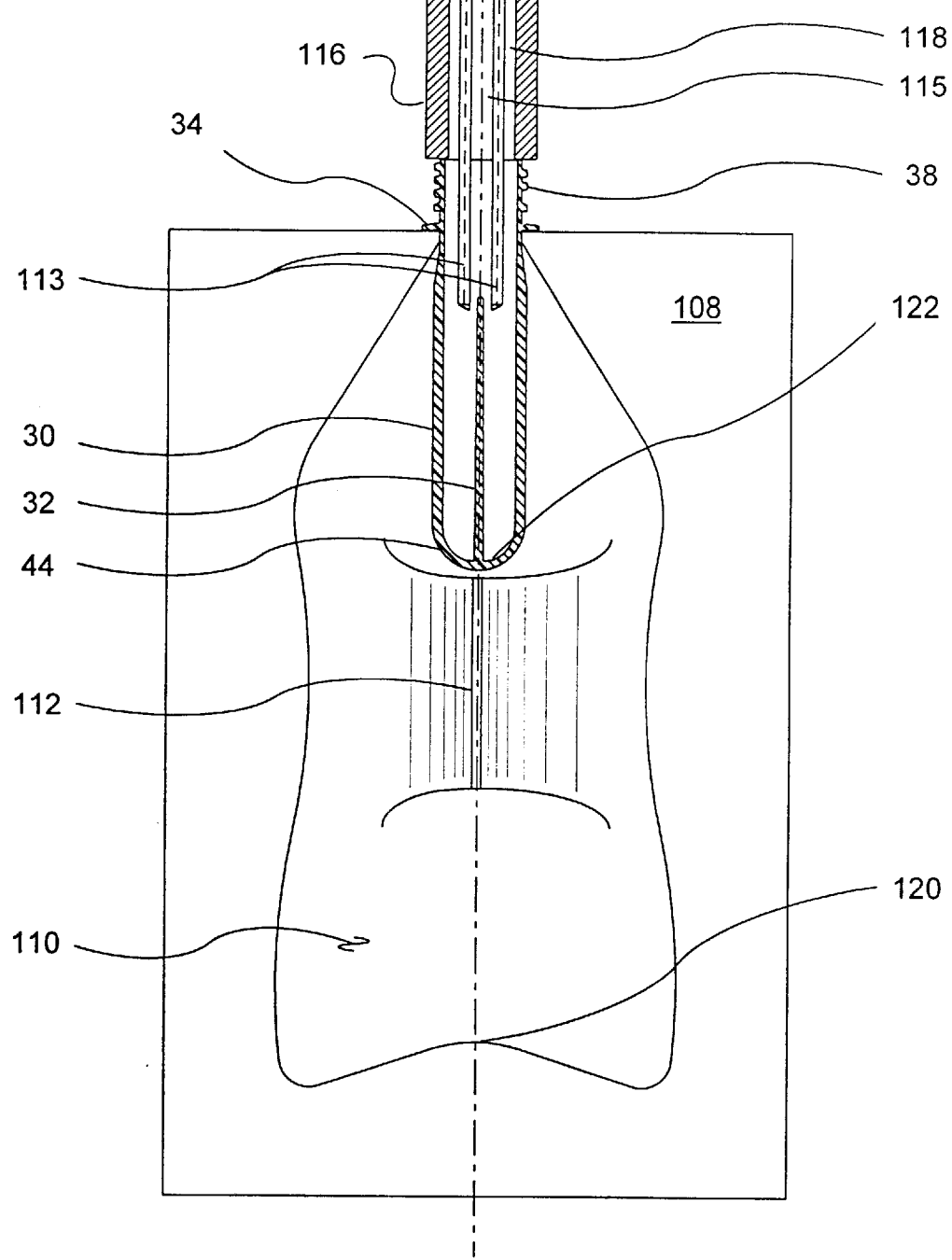
FIG. 14 is an elevational view of a bottle mold cavity with the cross-sectional sectional view of the preform shown in FIG. 3 in proper position and with a stretch rod partially extended inside the preform.

FIG. 14 is a view of one half of a bottle blow mold 108 with a blow mold cavity 110. The non-illustrated half being a mirror image of the illustrated mold 108. In the cavity's center is a molding surface 112 for forming one depression of the hand-grip of the bottle. FIG. 14 shows preform 30 resting with its body portion 42 in cavity 110 and handling ring 34 against the top of mold 108. Web 32 is in precise alignment with molding surfaces 112 so as to extend therebetween when eventually blow molded into a bottle. An air nozzle 116 is in contact with the open end 40 of neck portion 38 of preform 30. Inside the air nozzle 116 and extending into preform 30 is a partially extended hollow stretch rod 114. The stretch rod 114 is split with two tongs 113 defining a slot 115 intended to straddle the preform web 32 and engage an interior surface 122 of preform closed end 44. The stretch rod 114, with a reciprocal travel direction 117, is located in an air passageway 118 with sufficient clearance to allow air to flow into the preform 30 with minimal restriction.

Figure 15:
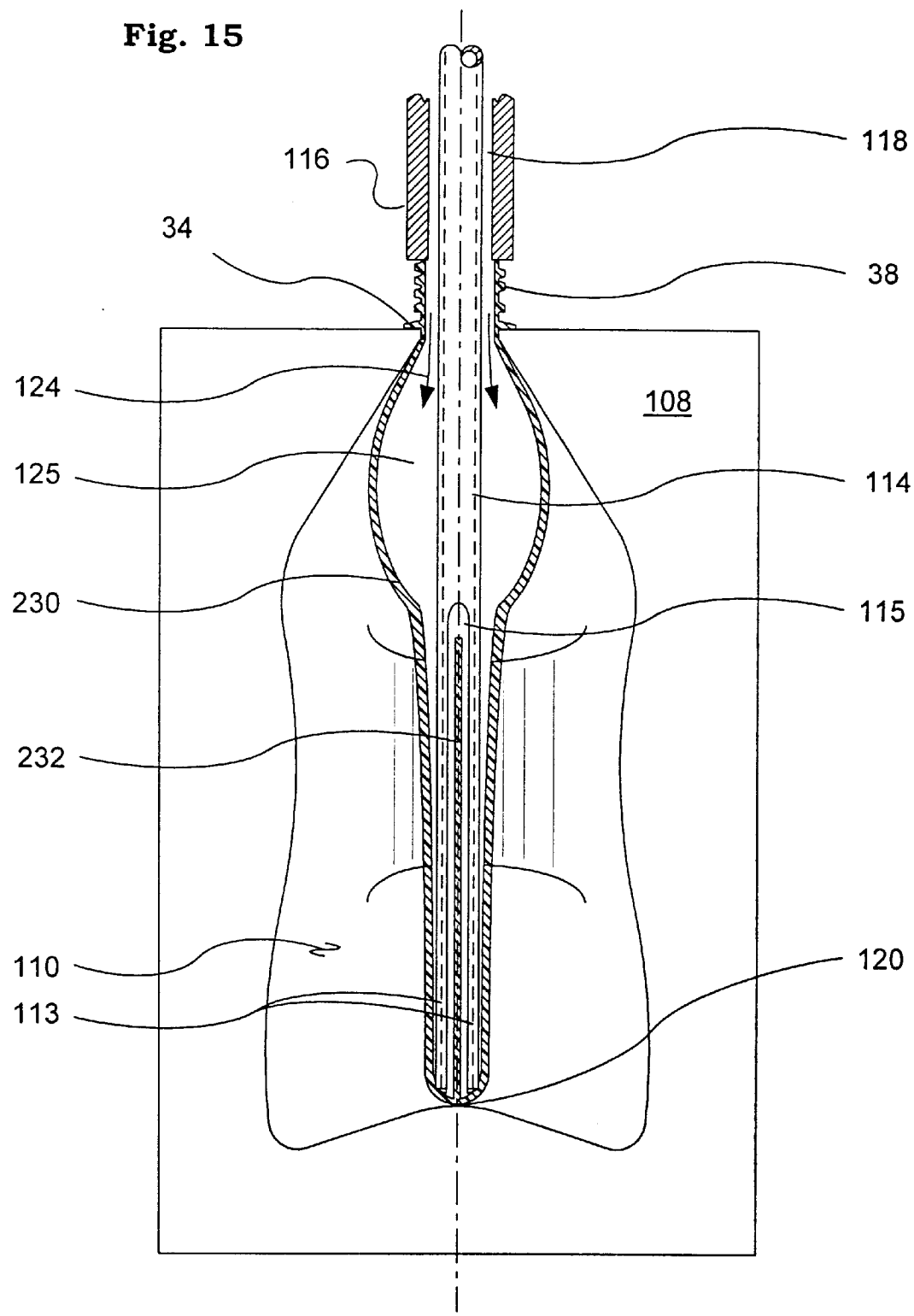
FIG. 15 is an elevational view of the bottle mold cavity with the stretch rod in a fully extended position and a cross-sectional view of a change in shape in the preform shown FIG. 3 when stretched in an axial direction.

FIG. 15 is a view similar to FIG. 14 except it shows an axially stretched preform 230 with stretch rod 114 fully extended. Slot 115 provides clearance for axially stretched web 232. Preblow airflow 124 causes a portion of the axially stretched preform 230 to stretch circumferentially 125.

Figure 16:
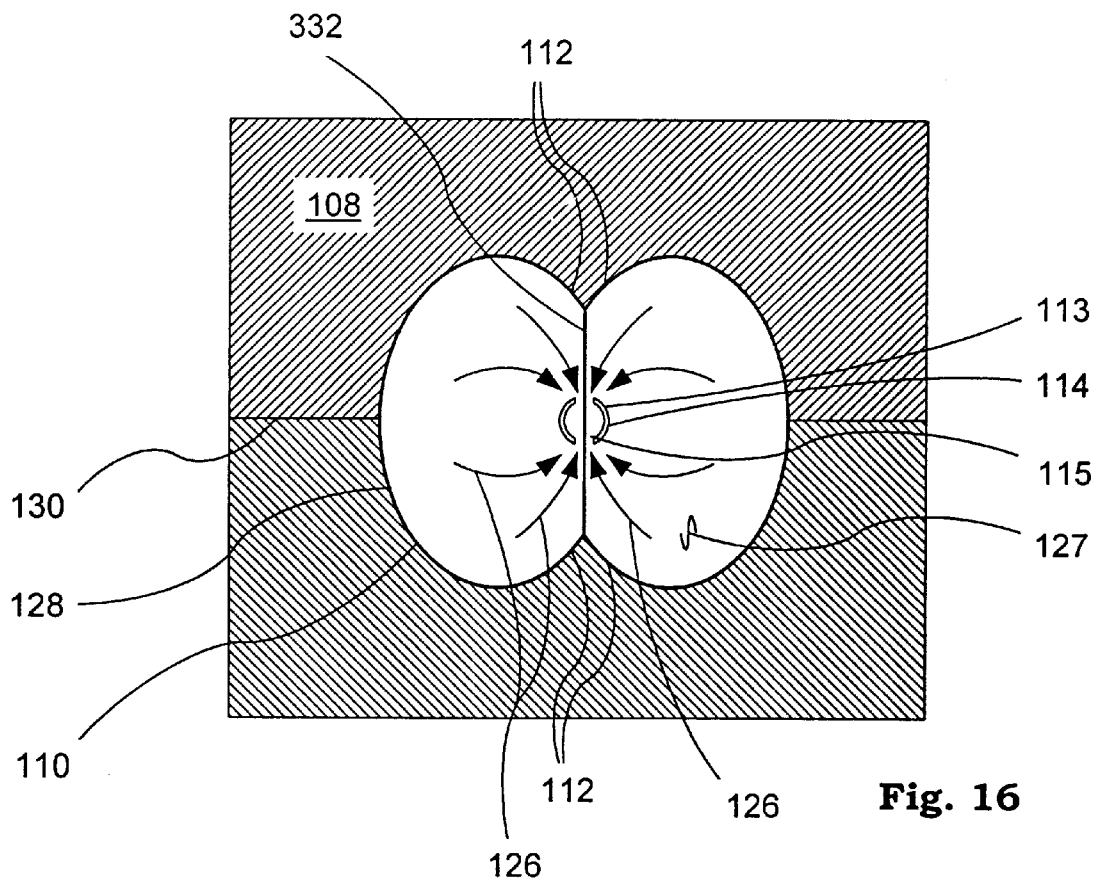
FIG. 16 is a cross-sectional view of the bottle mold cavity with a formed bottle having an internal web structure and illustrating a relationship of the stretch rod to the internal web structure.
Figure 16A:
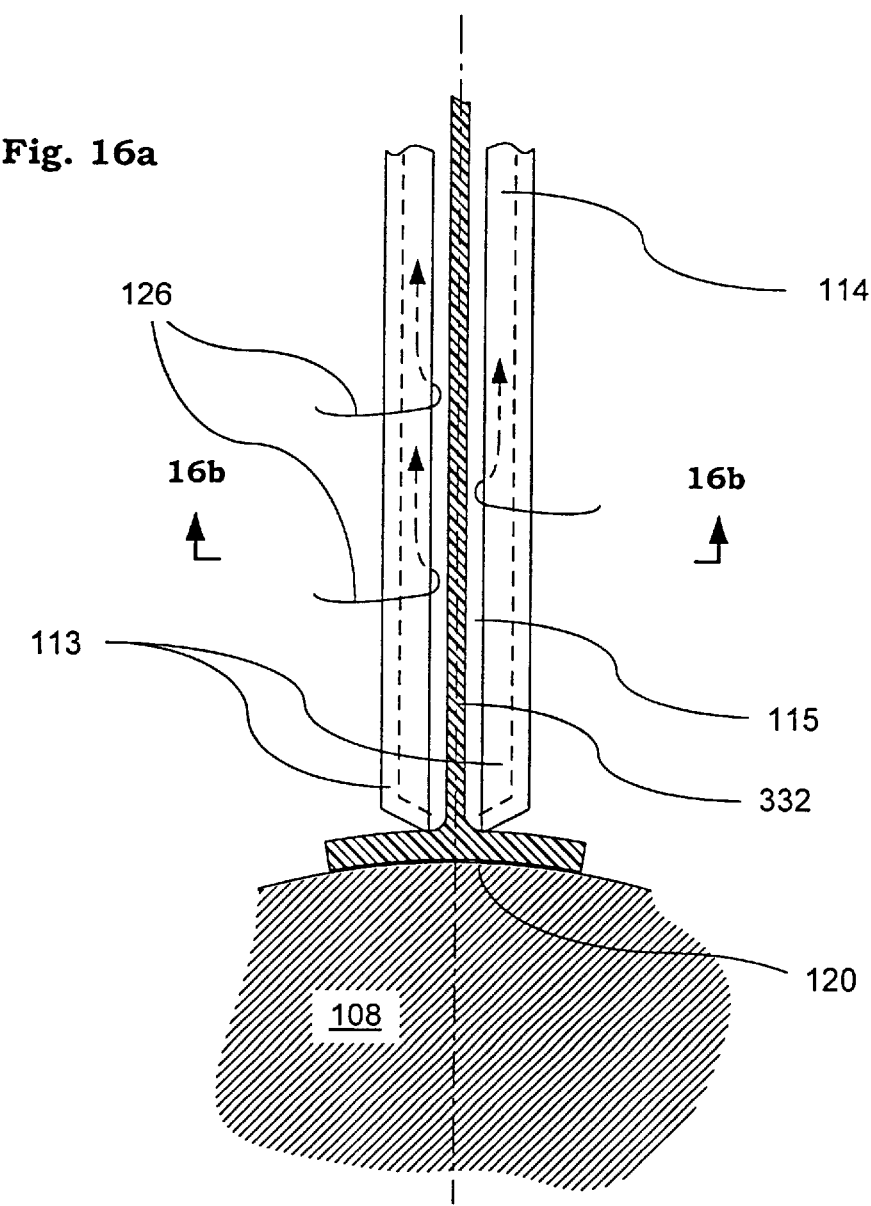
FIG. 16a is a view of the stretch rod contact with a bottom region of the bottle and further illustrating the relationship of the stretch rod to the internal web structure.
Figure 16B:
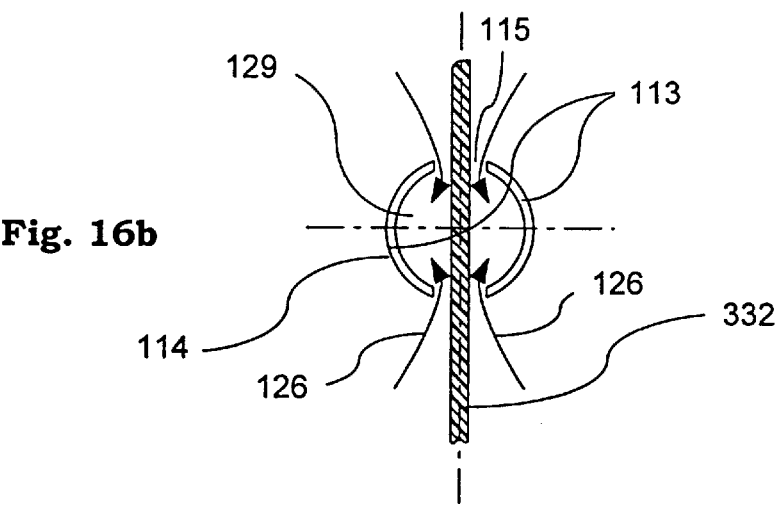

FIG. 16 is a cross-sectional view of both halves of a blow mold 108 in a closed position with a parting line 130. Inside mold cavity 110 is a blow-molded bottle 127 with a sidewall 128. Biaxially stretched web 332 blends with bottle sidewall 128 and is in a position between the two molding surfaces 112 intended for forming handgrip depressions in the bottle 127. Straddling, one on either side, biaxially stretched web 332 are tongs 113 of stretch rod 114. Arrows 126 in FIG. 16a indicate airflow direction toward the tongs 113 and into a tong passageway 129 in FIG. 16b exposed in the hollow stretch rod 114 by slot 115. Flowing air out of the bottle 127 along arrows 126 during blow molding cools the biaxially stretched web 332. The passageway in the hollow stretch rod 114 is also the passageway to evacuate air used to inflate the preform 30 and mold the bottle 127.

Figure 17:
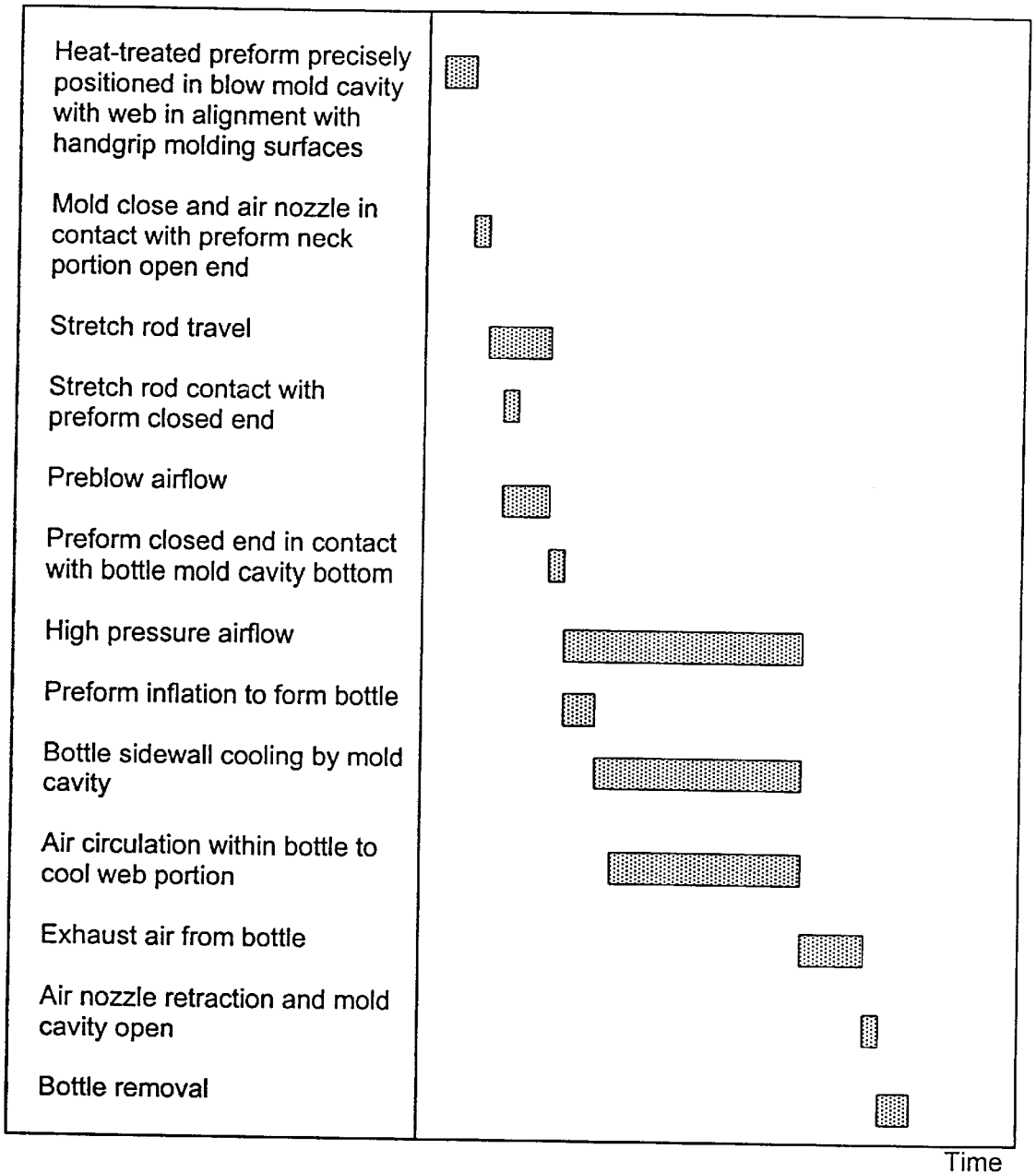
FIG. 17 is a chart illustrating a sequence of key events in order of occurrence as the preform is transformed into the bottle by the blow molding section of the blow molding machine shown in FIG. 1.

FIG. 17 summarizes the preferred method for blow molding the heat-treated preform 30 into the bottle. Bottle transfer 22 precisely positions heat-treated preform 30 in blow mold cavity 110 with web 32 aligned with hand-grip molding surfaces 112. Next, both halves of mold 108 close and air nozzle 116 contacts open end 40 of neck portion 38 of preform 30. Next, stretch rod 114 begins to travel and initially contacts interior surface 122 of preform closed end 44.

Preblow airflow 124 initiates the moment the moving stretch rod 114 contacts the interior surface 122. Preblow airflow 124 continues to flow until the stretch rod 114 completes its stroke and brings closed end 44 in contact with blow mold cavity bottom 120.

Preblow airflow 124, working in unison with the extension of stretch rod 114, helps complete the axial molecular orientation of the PET material and influences distribution of material within the blow molded bottle 127. If preblow airflow 124 initiates before stretch rod 114 contacts preform closed end interior surface 122, the closed end 44 will likely shift to one side of stretch rod 114 creating an undesirable, uneven wall thickness distribution toward one side of the bottle 127 over the opposite side. If preblow airflow 124 initiates significantly after stretch rod 114 contacts preform closed end interior surface 122, the resultant sidewall portion and particularly the base portion of the blow molded bottle 127 will be too thick and too heavy. The web 32 strengthens a portion of the preform 30 and retards stretch of that portion in the axial direction. This in turn shifts an excessive amount of material toward the bottle base. The inventors believe the preblow airflow 124 causes the transition region 43 above web 32 of the preform 30 to inflate slightly and to stretch slightly in the circumferential direction 125. This inflation and stretch causes the transition region 43 of preform 30 to contact the shoulder portion of the blow mold cavity 110 and the PET material to "strain harden" and reduce slightly an ability of the material to stretch. This contact and strain hardening creates a resistance that allows the web 32 and preform body portion 42 to stretch uniformly.

Preblow airflow 124 has an air pressure that is significantly less than the high-pressure airflow used to inflate the preform 30. When initiated properly, the inventors discovered preblow airflow 124 pressure is directly proportional to positioning of web 332 relative to bottle 127. The termination edge 53 of the web 32 of preform 30 closest to the neck portion 38 shifts, when blow molded, to a position measurably closer to the shoulder portion of the blow molded bottle 127 with an increase in preblow air pressure. The termination edge 53 shifts measurably away from the shoulder portion of the blow molded bottle 127 with a decease in preblow air pressure.

Initiation of high-pressure airflow is the next step for blow molding the heat-treated preform 30 into the bottle 127. High-pressure airflow initiates when the stretch rod 114 extends fully and the preform closed end contacts blow mold cavity bottom 120. If high-pressure airflow initiates before the stretch rod 114 extends fully, the preform closed end 44 will likely shift to one side creating an undesirable uneven wall thickness distribution. The high-pressure airflow completes the biaxial molecular orientation of the material by stretching the already axially stretched preform in the circumferential direction. Upon contact with the material, the blow mold cavity 110 quickly cools the inflated preform now in the shape of the bottle 127.

Initiation of air circulation inside the bottle 127 is the next step for blow molding the heat-treated preform 30 into the bottle 127. The bottle sidewall 128 cools quickly when in contact with the blow mold cavity 110 surfaces, but the biaxially stretched web 332 is not in contact with a mold surface and therefore does not cool quickly. Once high-pressure airflow fully forms the bottle, a high-pressure, high velocity airflow moving from air passageway 118 of FIG. 14, through the blow molded bottle 127 of FIG. 16 and into the tong passageway 129 of the hollow stretch rod 114, cools web 332. To allow enough time to cool the web, the air circulation must begin immediately following preform 30 inflation in the blow mold cavity 110.

Following the blow molding and cooling, high-pressure air exhausts from the bottle 127, the air nozzle 116 and stretch rod 114 retract allowing the bottle to be removed form the blow molding machine 10.

The inventors discovered that for adequate bottle performance the web 332 must have a taut, smooth, and flat appearance. The taut web 332 in effect creates a slightly preloaded structure that is better able to accept the pressure created from filling and sealing the bottle 127 with the highly carbonated beverage.

Inadequate web cooling creates a somewhat loose, distorted, and warped appearance and increases PET material crystallinity at the point where the web blends 50 with the bottle sidewall 128. Filling and sealing the inadequately cooled bottle with the highly carbonated beverage allows the bottle sidewall 128 to expand until the web suddenly becomes loaded. The sudden stress of this loading coupled with a slightly weakened condition created by the increased crystallinity at the point where the web blends 50 with the bottle sidewall 128 often leads to bottle failure.

While the above description discloses the preferred embodiment of the invention, it will become apparent to those skilled in the art that modifications, variations, and alterations may be made without deviating from the inventor's scope and spirit as defined in the following claims.

The inventors claim:

1. A machine for blow molding a bottle with an internal web structure positioned between two handgrip depressions utilizing a preform having a neck portion with an open end, a body portion depending from said neck portion, a bottom portion depending from said body portion and forming a closed end, the neck portion, body portion, and bottom portion defining a hollow space and having a common longitudinal axis extending therethrough, and an internal web portion extending completely across said hollow space between opposing sides of at least a portion of the body portion, said machine comprising:
   a) an in-feeder, said in-feeder feeding the preform into said machine;
   b) a heating station including at least one heating source and at least one reflector positioned to selectively impart heat to the internal web portion while preventing over-heating of the body portion of the preform as the preform is conveyed therethrough;
   c) an inflating station having a blow mold, said blow mold including surfaces defining a cavity of a bottle shape with handgrip depressions; and
   d) means for enhancing cooling of the internal web portion after inflating the preform in said inflating station into the shape of a bottle having handgrip portions and before removal from said blow mold.

2. A machine according to claim 1 further comprising a conveyor receiving the preform from said in-feeder, said conveyor including a portion engaging a notch in a handling ring of the preform prior to entry into said heating station.

3. A machine according to claim 1 wherein said heating station includes a plurality of oven units each having at least one energy source and at least one reflector.

4. A machine according to claim 2 wherein said conveyor includes means for rotating the preform about the common axis while simultaneously moving the preform through said heating station.

5. A machine according to claim 4 wherein said means for rotating maintains a controlled relationship between said at least one heating source and said at least one reflector.

6. A machine according to claim 5 comprising a plurality of reflectors, said reflectors being spaced apart defining a plurality of openings.

7. A machine according to claim 6 comprising means for providing a flow of cooling air through said plurality of openings.

8. A machine according to claim 1 wherein said at least one reflector has a width between 150 percent to 25 percent of a diameter of the preform.

9. A machine according to claim 6 wherein said means for rotating rotates the preform 180 degrees between linearly adjacent ones of said reflectors.

10. A machine according to claim 6 wherein said means for rotating positions the internal web portion generally perpendicular to said reflectors at a time when the preform is adjacent thereto.

11. A machine according to claim 10 wherein a centerline of said reflectors is in a position relative to a centerline of the internal web portion off-set between zero and 50 percent of a diameter of the preform when the internal web portion is generally perpendicular to said reflector.

12. A machine according to claim 1 wherein said reflectors are generally flat.

13. A machine according to claim 1 wherein said reflectors are curved.

14. A machine according to claim 13 wherein said reflector is curved in one of a shape selected from the group: a section of a cylinder, a sphere, a paraboloid, and an ellipsoid.

15. A machine according to claim 6 wherein said reflectors are angled with respect to a line of travel of the preform.

16. A machine according to claim 1 wherein said inflating station includes a stretch rod having a slot one end defining two tongs, said tongs positioned to straddle the internal web portion and engage an interior surface of the bottom portion of the preform during inflating of the preform.

17. A machine according to claim 16 wherein said means for enhancing cooling of the internal web portion includes a flow of air circulating within said bottle and exiting through an opening between said tongs of said stretch rod.

18. A machine for blow molding a bottle with an internal web structure positioned between two handgrip depressions utilizing a preform having a neck portion with an open end, a body portion depending from said neck portion, a bottom portion depending from said body portion and forming a closed end, said neck portion, body portion, and bottom portion defining a hollow space with a common axis and a circular cross-sectional shape, an internal web portion extending completely across said hollow space from said bottom portion and terminating within said body portion, and said neck portion includes a handling ring with a notch in alignment with said web portion, said machine comprising:
  a) a preform in-feed and alignment device that positions said preform utilizing said notch in said handling ring;
  b) an oven unit with a series of heating units, each said heating unit contains an energy source and an energy reflector surface for heating said body portion, bottom portion, and internal web portion; said preform rotates about said common axis while simultaneously moving through said oven unit and said internal web portion is kept in a controlled relationship with said oven unit as said preform rotates;
  c) means for inflating said preform in a bottle blow mold cavity defining said handgrip depressions; and
  d) means for cooling said internal web structure of said bottle before removal from said bottle blow mold cavity.

19. A machine according to claim 18 wherein said energy reflector surface of said heating unit includes a plurality of louvered openings and a flow of cooling air moves through said louvered openings.

20. A machine according to claim 18 wherein said heating unit includes a plurality of preferential energy reflector surfaces and a width of one said preferential energy reflector surface is approximately between 150 percent to 25 percent of a diameter of said preform and said preferential energy reflector surfaces are each one from the other linearly positioned 180 degrees of rotation of said preform and each one of said preferential energy surfaces generally perpendicular to said web portion at a point adjacent as said preform rotates while simultaneously moving along a locus of points through said oven unit.

21. A machine according to claim 20 wherein a centerline of one said preferential energy reflector surface is in a position relative to a centerline of said web portion off-set between zero and 50 percent of a diameter of said preform when said centerline of said web portion is generally perpendicular to said preferential reflector surface.

22. A machine according to claim 20 wherein said preferential reflector surface is one of generally flat in character and curved in character and a flow of cooling air moves through an open space between adjacent said preferential reflector surfaces.

23. A machine according to claim 18 wherein said oven unit includes a series of at least one heating unit with said energy reflector surface, a heating unit with said energy reflector surface containing a plurality of louvered openings, and a heating unit with a plurality of preferential energy reflector surfaces.

24. A machine according to claim 18 wherein said means for inflating said preform in said bottle blow mold cavity defining said handgrip depressions includes a transfer of said preform from said means for heating said body portion, bottom portion, and internal web portion in a manner sufficient to maintain an alignment of said web portion between a first molding surface of said handgrip depressions and a second molding surface of said handgrip depressions in said blow mold cavity.

25. A machine according to claim 24 wherein said means for inflating said preform in said bottle blow mold cavity defining said handgrip depressions includes a hollow stretch rod with two tongs at one end, said tongs defining a clearance slot for straddling said web portion and for engaging an interior surface of said bottom portion.

26. A machine according to claim 18 wherein said means for cooling said internal web structure of said bottle before removal from said bottle blow mold cavity includes a flow of air circulating within said bottle entering from an air nozzle in contact with said neck portion and leaving through an opening facing said internal web structure within each of said tongs of said hollow stretch rod.

27. A blow molding station of a machine for heat treating and blow molding a bottle with an internal web structure positioned between two handgrip depressions utilizing a preform having a neck portion with an open end, a body portion depending from said neck portion, a bottom portion depending from said body portion and forming a closed end, said neck portion, body portion, and bottom portion defining a hollow space with a common axis and a circular cross-sectional shape, an internal web portion extending completely across said hollow space from said bottom portion and terminating within said body portion, and said neck portion includes a handling ring with a notch in alignment with said web portion, said machine comprising:
  a) a preform in-feed and alignment device that positions said preform utilizing said notch in said handling ring;
  b) an oven unit with a series of heating units, each said heating unit contains an energy source and an energy reflector surface for heating said body portion, bottom portion, and internal web portion; said preform rotates about said common axis while simultaneously moving through said oven unit and said internal web portion is kept in a controlled relationship with said oven unit as said preform rotates;
  c) a preform transfer that places said preform in a bottle blow mold cavity and aligns said web portion between a first molding surface of said handgrip depressions and a second molding surface of said handgrip depressions in said blow mold cavity;
  d) a hollow stretch rod with two tongs at one end, said tongs defining a clearance slot for straddling said web portion and for engaging an interior surface of said bottom portion;
  e) a supply of preform preblow air entering through an air nozzle in contact with said neck portion;
  f) a supply of high pressure air entering through said air nozzle to inflate said preform and form said bottle;
  g) a flow of cooling air within said bottle from said air nozzle to an opening facing said internal web structure within each of said tongs of said hollow stretch rod and exhausting said flow of cooling air out of said bottle through said hollow stretch rod; and
  h) a bottle transfer from said bottle blow mold cavity that places said bottle in a bottle output device.

28. A machine according to claim 27 wherein said energy reflector surface of said heating unit includes a plurality of louvered openings and a flow of cooling air moves through said louvered openings.

29. A machine according to claim 27 wherein said heating unit includes a plurality of preferential energy reflector surfaces and a width of one said preferential energy reflector surface is approximately between 150 percent to 25 percent of a diameter of said preform and said preferential energy reflector surfaces are each one from the other linearly positioned 180 degrees of rotation of said preform and each one of said preferential energy surfaces generally perpendicular to said web portion at a point adjacent as said preform rotates while simultaneously moving along a locus of points through said oven unit.

30. A machine according to claim 29 wherein a centerline of one said preferential energy reflector surface is in a position relative to a centerline of said web portion off-set between zero and 50 percent of a diameter of said preform when said centerline of said web portion is generally perpendicular to said preferential reflector surface.

31. A machine according to claim 29 wherein said preferential reflector surface is one of generally flat in character and curved in character and a flow of cooling air moves through an open space between adjacent said preferential reflector surfaces.

32. A machine according to claim 27 wherein said oven unit includes a series of at least one heating unit with said energy reflector surface, a heating unit with said energy reflector surface containing a plurality of louvered openings, and a heating unit with a plurality of preferential energy reflector surfaces.

* * * * *